US008711127B2

(12) United States Patent
Goertz

(10) Patent No.: US 8,711,127 B2
(45) Date of Patent: Apr. 29, 2014

(54) SCANNING OF A TOUCH SCREEN

(71) Applicant: Neonode Inc., Santa Clara, CA (US)

(72) Inventor: Magnus Goertz, Lidingo (SE)

(73) Assignee: Neonode Inc., Santa Clara, CA (US)

( * ) Notice: Subject to any disclaimer, the term of this patent is extended or adjusted under 35 U.S.C. 154(b) by 0 days.

(21) Appl. No.: 13/900,260

(22) Filed: May 22, 2013

(65) Prior Publication Data
US 2013/0271428 A1 Oct. 17, 2013

Related U.S. Application Data

(63) Continuation of application No. 12/667,692, filed as application No. PCT/SE2007/050508 on Jul. 6, 2007, now Pat. No. 8,471,830.

(51) Int. Cl.
G06F 3/042 (2006.01)

(52) U.S. Cl.
USPC .......................... 345/175; 345/173; 345/207

(58) Field of Classification Search
None
See application file for complete search history.

(56) References Cited

U.S. PATENT DOCUMENTS

| 4,313,109 | A | * | 1/1982 | Funk et al. | 341/5 |
| 5,036,187 | A | * | 7/1991 | Yoshida et al. | 250/214 B |
| 5,179,369 | A | * | 1/1993 | Person et al. | 345/175 |
| 6,762,747 | B2 | * | 7/2004 | Fujioka et al. | 345/157 |
| 7,312,787 | B2 | * | 12/2007 | Fujioka et al. | 345/156 |
| 7,638,754 | B2 | * | 12/2009 | Morimoto et al. | 250/226 |
| 8,068,101 | B2 | * | 11/2011 | Goertz | 345/175 |
| 2004/0056199 | A1 | * | 3/2004 | O'Connor et al. | 250/341.1 |
| 2004/0263482 | A1 | * | 12/2004 | Goertz | 345/173 |
| 2005/0248540 | A1 | * | 11/2005 | Newton | 345/173 |
| 2009/0244018 | A1 | * | 10/2009 | Lin et al. | 345/173 |
| 2011/0128234 | A1 | * | 6/2011 | Lipman et al. | 345/173 |

OTHER PUBLICATIONS

Hodges, S., Izadi, S., Butler, A., Rrustemi, A. and Buxton, B., "ThinSight: Versatile Multitouch Sensing for Thin Form-Factor Displays", UIST'07, Oct. 7-10, 2007. http://www.hci.iastate.edu/REU09/pub/main/telerobotics_team_papers/thinsight_versatile_multitouch_sensing_for_thin_formfactor_displays.pdf.

Moeller, J., Lupfer, N., Hamilton, B., Lin, H. and Kerne, A., "IntangibleCanvas: Free-Air Finger Painting on a Projected Canvas", CHI 2011, Proceedings of the 2011 Annual Conference on Human Factors in Computing Systems, Extended Absracts, ACM, New York, NY, May 2011, pp. 1615-1620.

Moeller, J. and Kerne, A., "ZeroTouch: An Optical Multi-Touch and Free-Air Interaction Architecture", CHI 2012, Proceedings of the 2012 Annual Conference on Human Factors in Computing Systems, extended abstracts, ACM, New York, NY, May 2012, pp. 2165-2174.

* cited by examiner

Primary Examiner — Dismery Mercedes
(74) Attorney, Agent, or Firm — Soquel Group LLC

(57) ABSTRACT

A rectangular light-based touch-sensitive surface for an electronic device comprising a plurality of light emitters arranged along one and only one side of a surface, each emitter being activatable to emit light rays at a plurality of different angles across the surface, a plurality of light detectors arranged along the three remaining sides of the surface, each detector being activatable to register detection values of emitted light beams, wherein light emitted from each emitter is registered by two or more of the detectors, and a processor connected to the emitters and to the detectors operable to coordinate activations of the emitters and detectors, and to receive the registered detection values.

5 Claims, 3 Drawing Sheets

SCANNING OF A TOUCH SCREEN

PRIORITY REFERENCE TO RELATED APPLICATIONS

This application is a continuation of U.S. application Ser. No. 12/667,692 entitled SCANNING OF A TOUCH SCREEN, filed on Jan. 5, 2010 by inventor Magnus George Goertz. U.S. application Ser. No. 12/667,692 is a national stage entry of PCT Application PCT/SE2007/050508, entitled SCANNING OF A TOUCH SCREEN, filed on Jul. 6, 2007 by inventor Magnus George Goertz.

THE BACKGROUND OF THE INVENTION AND PRIOR ART

The present invention relates generally to solutions for scanning a touch screen in search of objects positioned on the screen to indicate input commands. More particularly the invention relates to an interface arrangement according to the preamble of claim 1, a mobile terminal according to the preamble of claim 9 and a method of generating input commands according to the preamble of claim 10. The invention also relates to a computer program product according to claim 17 and a computer readable medium according to claim 18.

The current trend in mobile and portable devices is that the devices are made physically smaller and smaller. At the same time, the devices are provided with more functionality and processing capacity. Therefore, flexible user interfaces are required to enable efficient input of commands and data, while allowing presentation of complex information. To this aim, touch screens and other types of multi-purpose interface means are highly useful.

US 2004/0263482 discloses a touch screen arrangement for a mobile telephone. Here, in addition to a display unit, the touch screen includes a number of light pulse emitting elements and a number of light receiving elements, which are arranged along the edges of the display unit. The emitting elements generate light pulses according to a predetermined sequence, and based on light energy registered by the receiving elements, it is determined whether or not a light-obstructive object (e.g. a fingertip) is present on the display unit. Hence, user-generated commands can be fed into the telephone.

However, depending on the conditions in which the telephone is operated the energy level received by the light receiving elements may vary substantially. For instance, when operated in direct sunlight, the received energy level is typically many factors of ten higher than the energy level received when the unit is operated in a dark or shaded environment.

SUMMARY OF THE INVENTION

The object of the invention is therefore to alleviate the above problems, and present a reliable and efficient solution for scanning a touch screen optically.

According to the invention, the object is achieved by the interface arrangement as initially described, wherein the processing unit is adapted to record an initial measurement value registered by at least one detector in the at least one array of light detectors prior to transmitting the light pulse. Thus, the initial measurement value represents an ambience light intensity. The processing unit is specifically adapted to determine whether or not a light-obstructive object is present on the display device based on the initial measurement value and a secondary measurement value registered by at least one light detector during emission of light from the light source.

The proposed arrangement is advantageous because the light detection is made relative to the ambience light intensity. Therefore, the effects of any variations in the surrounding light conditions can be cancelled out.

According to one preferred embodiment of the invention, the display device has a rectangular outline with four separate sides, and the at least one second side represents a respective side opposite to the at least one first side. Hence, each light detector may expediently register light pulses from one or more light sources.

According to another preferred embodiment of the invention, the interface arrangement includes a selection means adapted to control the at least one array of light sources to emit light from a given light source during a specified interval. Thereby, the predefined sequence of light pulses can be effected in a straightforward manner.

According to yet another preferred embodiment of the invention, the processing unit is adapted to cause pre-charging of at least one detector in the at least one array of light detectors in coordination with the light emitted from the given light source, such that the pre-charging is initiated at least a threshold time prior to a start of a specified interval. Namely, this enables registration of the initial measurement value representing the ambience light intensity.

According to still another preferred embodiment of the invention, the interface arrangement includes a digitizing unit, which is configured to receive measurement values from the at least one array of light detectors and in response thereto deliver digital data to the processing unit. Preferably, the processing unit is further configured to initiate the emission of light from a given light source no earlier than after that digital data representing the initial measurement value has been received by the processing unit. Consequently, it is ensured that the initial measurement value exclusively represents the ambience light.

According to another preferred embodiment of the invention, the processing unit is configured to control the at least one array of light sources such that each light pulse has a duration exceeding a conversion time of the digitizing unit for producing the digital data based on the received measurement values. Thereby, good data quality can be guaranteed, and thus also a reliable behavior of the proposed interface.

According to a further preferred embodiment of the invention, the processing unit is configured to cause pre-charging of at least one detector in the at least one array of light detectors in coordination with the light emitted from the given light source, such that the pre-charging is terminated no earlier than a delay time after expiry of the specified interval during which light is emitted from the given light source. The delay time here represents a conversion time of the digitizing unit for producing the digital data based on the received measurement values. The delay time is desirable because it enables detection of a maximum amount of energy in the emitted light pulse.

According to another aspect of the invention the object is achieved by the terminal described initially, wherein the terminal includes the interface arrangement of the above-proposed type.

According to yet another aspect of the invention, the object is achieved by the method described initially, wherein an initial measurement value is recorded, which has been registered by at least one detector in the array of light detectors prior to transmitting the light pulse. The initial measurement value thus represents an ambience light intensity. It is then determined whether or not a light-obstructive object is present on the display device based on the initial measurement value and a secondary measurement value registered by at least one light detector during emission of light from the source. The advantages of this method, as well as the preferred embodiments thereof, are apparent from the discussion hereinabove with reference to the proposed vehicle arrangement.

According to a further aspect of the invention the object is achieved by a computer program product directly loadable into the internal memory of a computer, comprising software for controlling the above proposed method when said program is run on a computer.

According to another aspect of the invention the object is achieved by a computer readable medium, having a program recorded thereon, where the program is to make a computer control the above proposed method.

Further advantages, advantageous features and applications of the present invention will be apparent from the following description and the dependent claims.

BRIEF DESCRIPTION OF THE DRAWINGS

The present invention is now to be explained more closely by means of preferred embodiments, which are disclosed as examples, and with reference to the attached drawings.

DESCRIPTION OF PREFERRED EMBODIMENTS OF THE INVENTION

Figure 1:
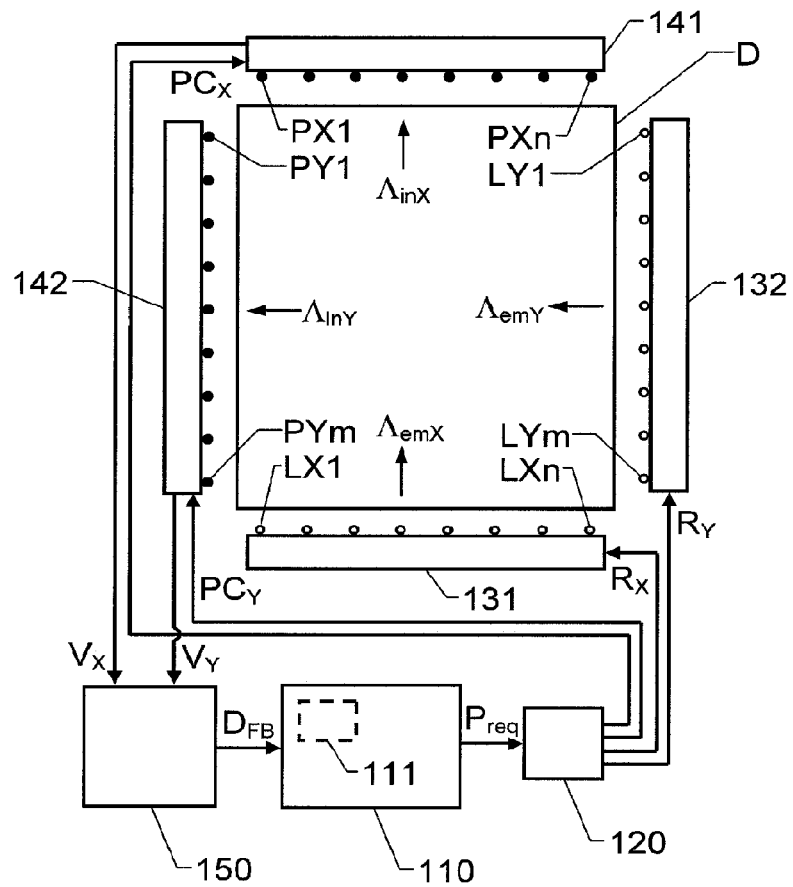
FIG. 1 shows a block diagram over an interface arrangement according to one embodiment of the invention.

We refer initially to FIG. 1, which shows a block diagram over an interface arrangement for receiving input commands in a mobile terminal according to one embodiment of the invention.

The arrangement includes a display device D, at least one array of light sources 131 and 132 respectively, at least one array of light detectors 141 and 142 respectively and a processing unit 110.

The display device D, e.g. including an LCD (Liquid Crystal Display) screen, is adapted to present visual information to a user. The arrays of light sources 131 and 132 are arranged along a respective side of the display device D. Preferably, the display device D has a rectangular outline with four separate sides. In such a case, a first array of light sources 131 may be arranged along a lowermost side of the display device D, and a second array of light sources 132 may be arranged along a rightmost side of the display device D as illustrated in FIG. 1. However, depending on the outline of the display device D and the design of software which controls the user interface, numerous alternative arrangements of the arrays of light sources 131 and 132 are likewise conceivable according to the invention. For example the light sources may exclusively be arranged along a single side of the display device D, and be configured to emit light rays at different angles across the display device D.

The arrays of light detectors 141 and 142 are arranged along a respective side of the display device D where no light sources are arranged. Thus, provided that the display device D has a rectangular outline with four separate sides as illustrated in FIG. 1, a first array of light detectors 141 may be arranged opposite to the first array of light sources 131, and a second array of light detectors 142 may be arranged opposite to the second array of light sources 132. However, technically, the arrays of light sources and detectors 131, 132, 141 and 142 can be arranged so that the arrays of light sources 131 and 132 are instead arranged along adjoining sides, and analogously, the arrays of light detectors 141 and 142 likewise are arranged along adjoining sides of the display device D.

In any case, each array of light sources is configured to transmit light pulses, here exemplified by $\Lambda_{emX}$ and $\Lambda_{emY}$, over the display device D. Moreover, each array of light detectors 141 and 142 is configured to receive a part $\Lambda_{inX}$ and $\Lambda_{inY}$ of the energy in the transmitted light pulses $\Lambda_{emX}$ and $\Lambda_{emY}$ respectively. Each light source, in turn, may either be configured to emit light in a relatively narrow lobe, such that its emitted light can be registered by one detector only; or in a comparatively wide lobe, such that its emitted light can be registered by two or more detectors.

The processing unit 110 is adapted to control the arrays of light sources 131 and 132, such that a respective light pulse $\Lambda_{emX}$ and $\Lambda_{emY}$ is repeatedly transmitted from each source LX1, ..., LXn and LY1, ..., LYm respectively in the arrays 131 and 132 according to a predefined sequence. The processing unit 110 is also adapted to receive information pertaining to light energy registered by the detectors PX1, ..., PXn; PY1, ..., PYm in the arrays of light detectors 141 and 142. Based thereon, the processing unit 110 is adapted to determine whether or not a light-obstructive object (e.g. represented by a fingertip) is present on the display device D between a given light source and at least one light detector in the arrays of light detectors 141 and 142. Naturally, the numbers n and m of light sources and light detectors in the arrays 131, 132, 141 and 142 depend on the desired accuracy/resolution at which a position of the light-obstructive element is to be determined. Moreover, as touched upon above, the number of light sources may be different from the number of light detectors. Nevertheless, for a typical implementation, the numbers n and m normally range from 4 to 20.

Specifically, according to the invention, the processing unit 110 is adapted to record an initial measurement value $V_1$, which is registered by at least one detector in the arrays of light detectors 141 and 142 prior to transmitting the light pulse $\Lambda_{emX}$ and $\Lambda_{emY}$. Hence, the initial measurement value $V_1$ represents an ambience light intensity. Then, based on the initial measurement value $V_1$ and a secondary measurement value $V_2$ that is registered by at least one light detector during emission of light from the light source, the processing unit 110 is adapted to determine whether or not a light-obstructive object is present on the display device D at such a position that this object intersects a path of the emitted light. Here, a light-obstructive object may be deemed to be present if the difference between the initial measurement value $V_1$ and the secondary measurement value $V_2$ exceeds a threshold value.

According to one preferred embodiment of the invention, the interface arrangement further includes a digitizing unit 150, which is configured to receive measurement values $V_X$ and $V_Y$ from the arrays of light detectors 141 and 142 respectively, and in response thereto deliver corresponding digital data $D_{FB}$ to the processing unit 110. Thereby, any light intensities registered by the light detectors may be processed in the unit 110 in a straightforward manner.

Preferably, the arrangement also includes a selection means 120 adapted to, on one hand, control the arrays of light sources 131 and 132 to emit light from a given light source during a specified interval; and on the other hand, control the arrays of light detectors 141 and 142 to register light energy in one or more detectors during corresponding specified intervals. The selection means 120 is either a separate unit (as illustrated in FIG. 1), or an integral module of the processing unit 110. In any case, based on a request signal $P_{req}$ originated in the processing unit 110, the selection means 120 is configured to generate a specific control signal $R_X$, $R_Y$, $PC_X$ or $PC_Y$ to the arrays of light sources 131 or 132, or the arrays of light detectors 141 or 142 respectively. Here, each control signal in a first set of control signals $R_X$ and $R_Y$ is adapted to cause light to be emitted from a particular light source in a given array of light sources 131 or 132, whereas each control signal in a second set of control signals $PC_X$ and $PC_Y$ is adapted to cause registration of light received by a particular light detector in a given array of light detectors 141 or 142.

It is further preferable if the processing unit 110 includes, or is associated with, a computer readable medium 111, e.g. a memory module, which stores a program, where the program is adapted to make the processing unit 110 control the proposed arrangement as described above.

Figure 2:
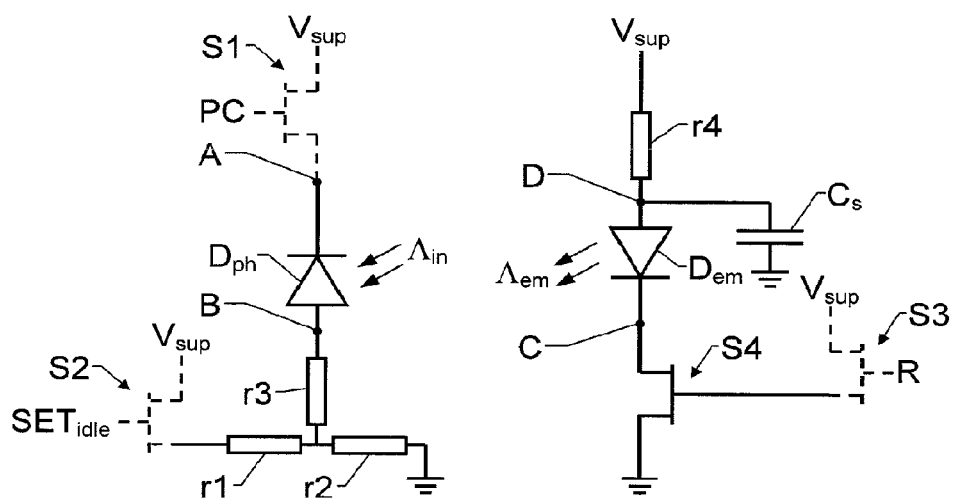
FIG. 2 shows schematic circuit diagrams over a light source and a light detector respectively according to one embodiment of the invention.

FIG. 2 shows a schematic circuit diagram over a light source and a light detector respectively according to one embodiment of the invention. The right hand circuitry represents one of the light sources in one of said arrays, say 132, whereas the left hand circuitry represents one of the light detectors in one of said arrays, say 142.

In the embodiment illustrated in FIG. 2, a first switch S1 is configured to pre-charge a photo diode $D_{ph}$ in response to a first control signal PC, e.g. embodied by the above signal $PC_Y$ from the selection means 120. Hence, the first control signal PC is adapted to cause the photo diode $D_{ph}$ to register an ambient light intensity. A set of resistors r1, r2 and r3 are arranged to accomplish appropriate bias voltages for a second switch S2 and the photo diode $D_{ph}$ respectively. The second switch S2 is configured to set the photo diode $D_{ph}$ in an active state or an idle state in response to a second control signal $SET_{idle}$, e.g. generated by the processing unit 110 and forwarded via the selection means 120. Preferably, both the first and second switches S1 and S2 are connected to a supply voltage $V_{sup}$, say 3V.

A third switch S3, is configured to control a fourth switch S4 in response to a third control signal R, e.g. embodied by the above signal $R_Y$ from the selection means 120. The fourth switch S4, in turn, is configured to activate a light emitting diode $D_{em}$, such that light energy $\Lambda_{em}$ is produced. A charge capacitor $C_s$ and a charging resistor r4 are connected to the light emitting diode $D_{em}$ and arranged to supply the required energy to the light emitting diode $D_{em}$. The charging resistor r4 is further connected to the supply voltage $V_{sup}$, say 3V.

Figure 3A:
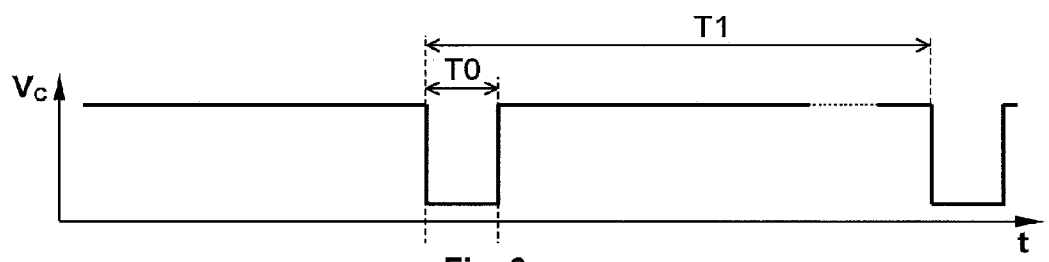
FIGS. 3a-d show diagrams illustrating examples of the timing relationship between a set of key signals in the circuit diagrams of FIG. 2.
Figure 3B:
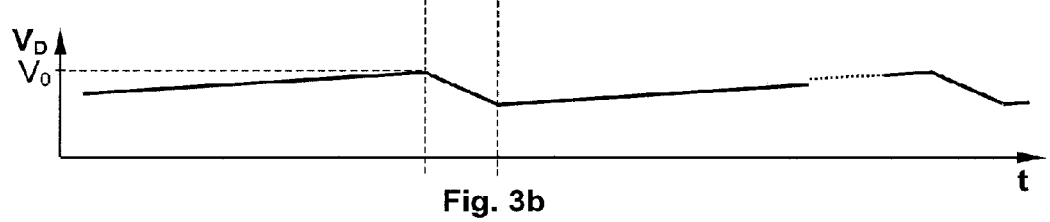
Figure 3C:
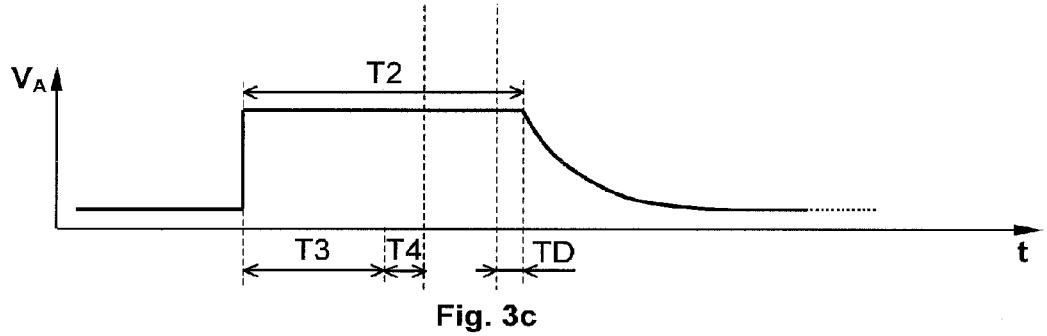
Figure 3D:
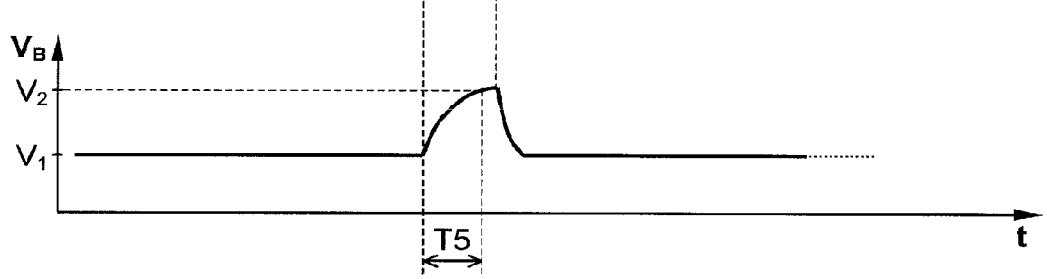

FIG. 3a shows a diagram illustrating one example of a voltage $V_c$ (in a point C downstream of the light emitting diode $D_{em}$ in FIG. 2) as a function of time t, FIG. 3b shows a diagram illustrating one example of a voltage $V_D$ (in a point D upstream of the light emitting diode $D_{em}$ in FIG. 2) as a function of time t, FIG. 3c shows a diagram illustrating one example of a voltage $V_A$ (in a point A upstream of the photo diode $D_{ph}$ in FIG. 2) as a function of time t, and FIG. 3d shows a diagram illustrating one example of a voltage $V_B$ (in a point B downstream of the photo diode $D_{ph}$ in FIG. 2) as a function of time t.

In this example, we presume that the predefined sequence of light pulses implemented by the processing unit 110 prescribes that a light pulse is to be generated by the light source (i.e. the light emitting diode $D_{em}$) during a specified interval T0, and that this light source shall produce a subsequent light pulse a time T1 later. The third control signal R causes a voltage dip in $V_c$ during the interval T0. As a result, the charge capacitor $C_s$ releases its stored energy through the light emitting diode $D_{em}$, and the diode emits light over the display device towards the photo diode $D_{ph}$.

As can be seen in FIG. 3b, during the interval T0, $V_D$ drops from a maximum value $V_0$ due to the drain of electric charges from the capacitor $C_s$. Thereafter, the capacitor $C_s$ is recharged until the time T1 has expired, and the procedure is repeated.

We now refer to FIGS. 3c and 3d. As mentioned above, an initial measurement value $V_1$ representing the ambience light intensity is registered by the light detector (i.e. the photo diode $D_{ph}$) prior to emitting the light pulse from the light emitting diode $D_{em}$). Thus, to this aim, the processing unit 110 controls the photo diode $D_{ph}$ in coordination with the light emitted from the light emitting diode $D_{em}$. Preferably, the processing unit 110 is configured to cause pre-charging of the photo diode $D_{ph}$ by forwarding the first control signal PC to the first switch S1. The processing unit 110 initiates this pre-charging at least a threshold time T3 prior to the start of the specified interval T0, and continues the pre-charging during an interval T2.

Moreover, it is preferred that the processing unit 110 is configured to initiate the emission of light from the light emitting diode $D_{em}$ no earlier than after that the processing unit 110 has been allowed sufficient time to receive digital data $D_{FB}$ (e.g. via the above-mentioned digitizing unit 150) representing the initial measurement valve $V_1$. In practice, this normally means that a period T4 after the threshold time T3 must also expire before the specified interval T0 can be initiated.

Additionally, according to one preferred embodiment of the invention, the processing unit 110 is configured to control the light detectors in coordination with the light pulses, such that the precharging interval T2 is terminated no earlier than a delay time TD after expiry of the specified interval T0 during which light is emitted from the given light emitting diode $D_{em}$. Consequently, the first and third control signals PC and R respectively have such timing interrelationship that the pre-charging interval T2 continues at least a period TD after ending the specified interval T0. Then, at the end of the delay time TD, the voltage $V_A$ is caused to drop down to a relatively low idle voltage in response to the first control signal PC. Here, the delay time TD represents a conversion time of the digitizing unit 150 for producing the digital data $D_{FB}$ based on the received measurement value, i.e. a secondary measurement value $V_2$ registered by the photo diode $D_{ph}$ during emission of light $\Lambda_{em}$ from the light source $D_{em}$.

In order to make sure that the secondary measurement value $V_2$ is registered while the light $\Lambda_{em}$ from the light emitting diode $D_{em}$ still is being emitted, the processing unit 110 is preferably configured to record digital data $D_{FB}$ representing this value a time T5 after the initiating of the specified interval T0, where T5<T0. In other words, it is advantageous if the processing unit 110 is configured to control the array of light sources 131 and 132 such that each light pulse $\Lambda_{em}$ (or $\Lambda_{emX}$ and $\Lambda_{emY}$ in FIG. 1) has a duration T0 exceeding a conversion time of the digitizing unit 150 for producing the digital data $D_{FB}$ based on the received measurement values. At the end of the specified interval T0, the voltage $V_B$ is caused to drop down from a value slightly exceeding the secondary measurement value $V_2$ in response to the first control signal PC. The voltage $V_B$ levels out at a $V_1$-value designating an updated ambient light intensity in respect of a subsequent light pulse.

Figure 4:
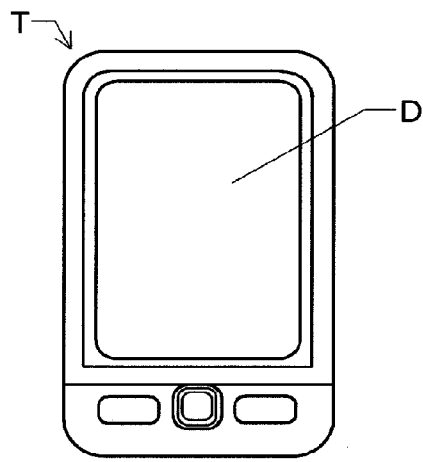
FIG. 4 illustrates a mobile terminal including the proposed interface arrangement.

FIG. 4 illustrates a mobile terminal T, which includes the above-described interface arrangement. Hence, the terminal T may be any type of device which is configured to process digital data in response to user-generated commands, and present processed information on a display device D integrated in the terminal T. I.e. the terminal may represent a cellular/mobile phone, a wireless telephone, a PDA (Portable Digital Assistant), a portable game device, or a hybrid unit comprising two or more thereof.

Figure 5:
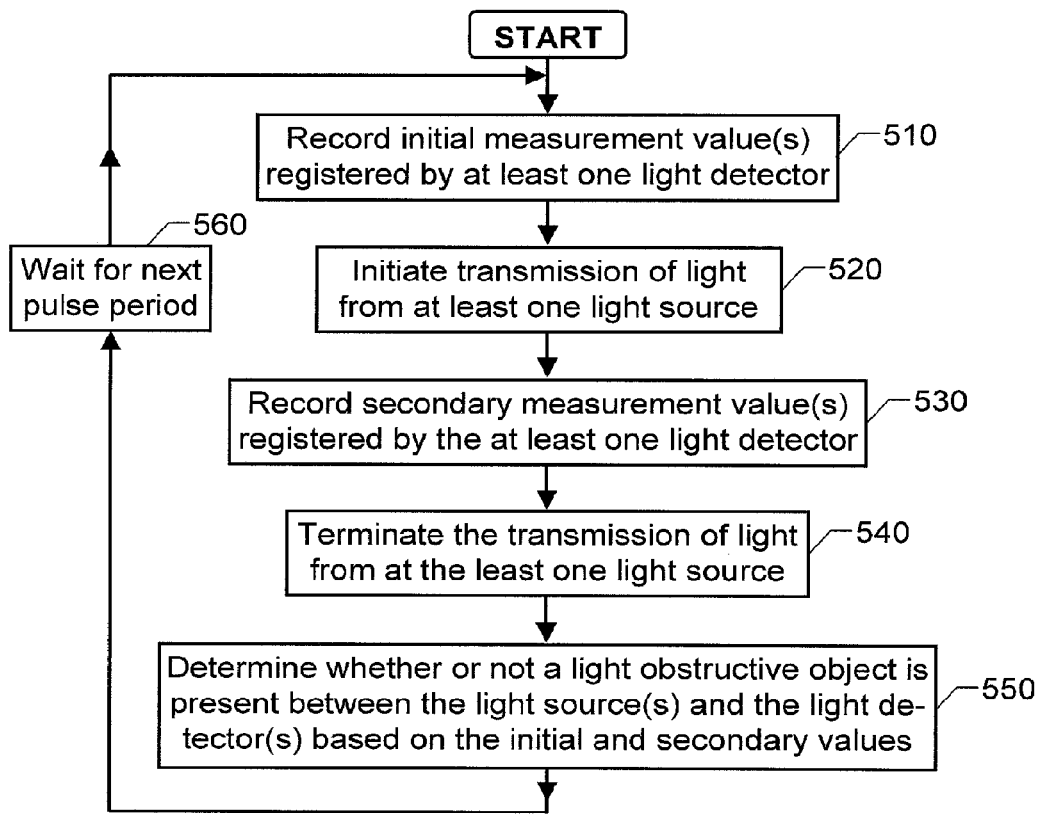
FIG. 5 shows a flow diagram illustrating the general method of generating input commands to a mobile terminal according to the invention.

In order to sum up, the general method of generating input commands to a mobile terminal according to the invention will be described below with reference to the flow diagram in FIG. 5.

A first step 510 records at least one initial measurement value, which is registered by at least one detector in an array of light detectors arranged along one side of a display device. The initial measurement value(s) is/are taken to represent(s) an ambience light intensity.

Subsequently, a step 520 initiates transmission of light over the display device from at least one light source in an array of light sources, which is arranged along a side of the display device different from the side where the array of light detectors is arranged. Hence, a light pulse starts. A step 530 then records a secondary measurement value registered by at least one light detector, i.e. during transmission of light from the at least one light source. Thereafter, a step 540 terminates the transmission of light from the at least one source in an array of light sources. Hence, the light pulse ends.

After that, based on the initial and secondary measurement values, a step 550 determines whether or not a light-obstructive object was present on the display device between the at least one light source and at least one light detector. Finally, the procedure loops back to step 510 via a step 560, which causes a predefined delay. The delay is here adapted to accomplish a desired separation in time between two consecutive light pulses, such that a respective light pulse is repeatedly transmitted from each source according to a predefined sequence.

All of the process steps, as well as any sub-sequence of steps, described with reference to the FIG. 5 above may be controlled by means of a programmed computer apparatus. Moreover, although the embodiments of the invention described above with reference to the drawings comprise computer apparatus and processes performed in computer apparatus, the invention thus also extends to computer programs, particularly computer programs on or in a carrier, adapted for putting the invention into practice. The program may be in the form of source code; object code, a code intermediate source and object code such as in partially compiled form, or in any other form suitable for use in the implementation of the process according to the invention. The carrier may be any entity or device capable of carrying the program. For example, the carrier may comprise a storage medium, such as a Flash memory, a ROM (Read Only Memory), for example a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the addition of one or more additional features, integers, steps or components or groups thereof.

The invention is not restricted to the described embodiments in the figures, but may be varied freely within the scope of the claims.

The invention claimed is:

1. A rectangular light-based touch-sensitive surface for an electronic device comprising:
    a plurality of light emitters arranged along one and only one side of a surface, each said emitter being activatable to emit light rays at a plurality of different angles across the surface;
    a plurality of light detectors arranged along the three remaining sides of the surface, each said detector being activatable to register detection values of emitted light beams, wherein light emitted from each said emitter is registered by two or more of said detectors; and
    a processor connected to said emitters and to said detectors, comprising a digitizing unit configured to receive the registered detection values and convert the values to digital data, the processor operable to:
        digitize an initial detection value registered by at least one of said light detectors prior to transmitting a light pulse of a designated emitter, the initial detection value representing an ambience light intensity;
        digitize a secondary detection value registered by at least one of said light detectors during transmission of light from the designated emitter; and
        control said light emitters such that each light pulse has a duration exceeding a time for said digitizing unit to produce the digital data.

2. The light-based touch-sensitive surface of claim 1, wherein the differently angled light rays form a wide lobe of light.

3. The light-based touch-sensitive surface of claim 1, wherein said processing unit is further operable to initiate transmission of light from the designated emitter no earlier than after the initial detection value has been digitized.

4. The light-based touch-sensitive surface of claim 3, wherein said processing unit is operable to delay initiating transmission of light from a second emitter after terminating the transmission of light from the designated emitter, thereby separating two consecutive light pulses.

5. The light-based touch-sensitive surface of claim 4, wherein said processing unit is further operable to repeatedly transmit light from the designated emitter prior to initiating the transmission of light from the second emitter.

* * * * *